(12) United States Patent
Yang et al.

(10) Patent No.: US 10,271,123 B2
(45) Date of Patent: Apr. 23, 2019

(54) WEARABLE ELECTRONIC DEVICE

(71) Applicant: SHENZHEN ROYOLE TECHNOLOGIES CO. LTD., Shenzhen, Guangdong (CN)

(72) Inventors: Songling Yang, Guangdong (CN); Chao Jiang, Guangdong (CN); Songya Chen, Guangdong (CN); Zihong Liu, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/569,459

(22) PCT Filed: Apr. 30, 2015

(86) PCT No.: PCT/CN2015/078151
§ 371 (c)(1),
(2) Date: Oct. 26, 2017

(87) PCT Pub. No.: WO2016/172989
PCT Pub. Date: Nov. 3, 2016

(65) Prior Publication Data
US 2018/0302704 A1    Oct. 18, 2018

(51) Int. Cl.
*H04R 1/10* (2006.01)
*G02B 27/01* (2006.01)

(52) U.S. Cl.
CPC .......... *H04R 1/1008* (2013.01); *G02B 27/01* (2013.01)

(58) Field of Classification Search
CPC .... H04R 1/105; H04R 1/1016; H04R 5/0355; H04R 1/1008; G02B 27/017
See application file for complete search history.

(56) References Cited

U.S. PATENT DOCUMENTS

| 8,942,404 B1 | 1/2015 | Serota |
| 2005/0256675 A1* | 11/2005 | Kurata ............... G02B 27/0093 702/153 |
| 2015/0097759 A1 | 4/2015 | Evans et al. |

FOREIGN PATENT DOCUMENTS

| CN | 202424987 U | 9/2012 |
| CN | 104503083 | 4/2015 |
| CN | 104503085 | 4/2015 |
| CN | 104503086 | 4/2015 |
| CN | 104536135 | 4/2015 |
| WO | 2011/137034 A | 11/2011 |

OTHER PUBLICATIONS

International search report dated Jan. 20, 2016 from corresponding application No. PCT/CN2015/078151.

* cited by examiner

*Primary Examiner* — Brian Ensey
(74) *Attorney, Agent, or Firm* — Hauptman Ham, LLP

(57) ABSTRACT

A wearable electronic device includes a headphone including two sound generators and an elastic band connecting the two sound generators; a display portion including two ends and a middle portion located between the two ends; and two extension mechanisms each of which connects one sound generator with a corresponding end of the display portion, a distance between the corresponding end of the display portion and the one sound generator being variable.

13 Claims, 2 Drawing Sheets

WEARABLE ELECTRONIC DEVICE

RELATED APPLICATIONS

The present application is a National Phase of International Application Number PCT/CN2015/078151, filed Apr. 30, 2015.

TECHNICAL FIELD

The present disclosure relates to a wearable electronic device, and more particularly, to a wearable electronic device having a stretchable structure.

BACKGROUND

Currently, wearable video devices are becoming more and more popular due to their good visual experience. A wearable video device typically includes a video part and an audio part. In some wearable video devices, headphones are utilized in order to achieve better audio effects. In this case, the video part may be rotatably connected to the headphone. When not in use, the video part is rotated to a position substantially overlapping the headphone so as to facilitate storage; when in use, the video part is rotated to a position substantially perpendicular to the headphone, such that the video part is located in front of eyes of a user wearing the wearable video device.

When the user is to wear the foregoing wearable video device, the headphone is firstly opened outward to facilitate being worn on the head. However, a distance between two sound generators of the headphone is actually increased when the headphone is opened outward, thereby causing the video part connected to the two sound generators to be deformed. The deformed video part produces a restoring force which increases a force for opening the headphone, which is disadvantageous for operations of the user.

SUMMARY

Implementations of the present disclosure provide a wearable electronic device having extension mechanisms which facilitates operations and is advantageous for improving service life.

A wearable electronic device includes a headphone including two sound generators and an elastic band connecting the two sound generators; a display portion including two ends and a middle portion located between the two ends; and two extension mechanisms each of which connects one sound generator with a corresponding end of the display portion, a distance between the corresponding end of the display portion and the one sound generator being variable.

In the present disclosure, when the two sound generators is separated apart from each other, the ends of the display portion can be moved close to or away from the sound generators respectively, due to the extension mechanisms, and thus, outward deformation of the ends of the display portion is greatly reduced, such that a restoring force caused by the deformation is also greatly reduced, thereby facilitating operations of the user.

BRIEF DESCRIPTION OF THE DRAWINGS

Accompanying drawings are intended to describe the present disclosure in detail, in conjunction with various implementations. It should be understood that various elements illustrated in the drawings do not represent actual sizes and proportions, and illustrations which are given merely for the purpose of clarity are not construed as a limit to the present disclosure.

DETAILED DESCRIPTION

The present disclosure is further described in detail hereinafter with reference to the implementations and drawings, in order to more fully understand purposes, solutions, and advantages of the present disclosure. It should be understood that, the implementations described herein are merely for explaining the present disclosure and are not intended to limit the present disclosure. It should be noted that a "connection" between two elements mentioned herein may not necessarily refer to a direct connection, and may be an indirect connection via a third element.

Figure 1:
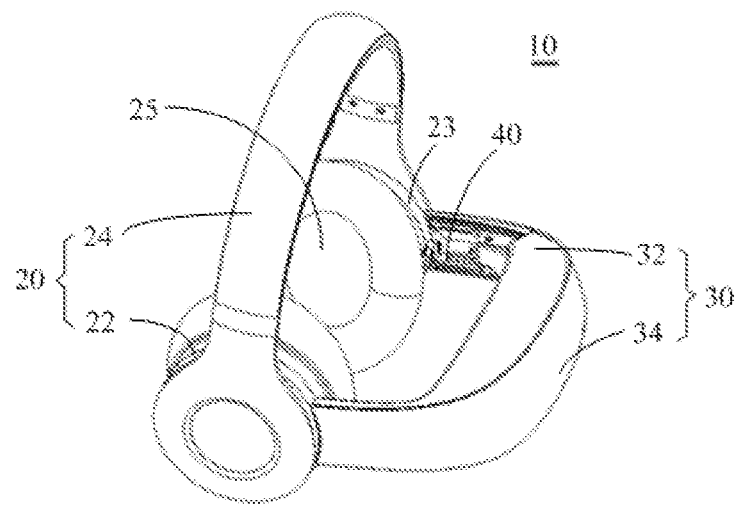
FIG. 1 is a schematic view of a wearable electronic device according to a first implementation of the present disclosure.

FIG. 1 is a schematic view of a wearable electronic device 10 according to a first implementation of the present disclosure. The wearable electronic device 10 may be a wearable video player, a wearable game device, a wearable navigation device, or the like. The wearable electronic device 10 includes a headphone 20, a display portion 30, and two extension mechanisms 40 connecting the headphone 20 to the display portion 30.

The headphone 20 includes two sound generators 22 and an elastic band 24 for connecting the two sound generators 22. The elastic band 24 has a substantial C-shape, and the two sound generators 22 are connected to two sides of the opening of the C-shape of the elastic band 24 respectively. The two sound generators 22 can be held on ears respectively, by an elastic force produced by the elastic band 24. The headphone 20 has a structure which is not quite different from the related headphone and thus not described in detail herein. The display portion 30 includes two ends 32 and a middle portion 34 located between the two ends 32. The middle portion 34 also has a substantial C-shape, and is provided with a display module and an optical module (not illustrated) in the middle thereof for near-eye display. The two ends 32 are connected to the two sound generators 22 by the extension mechanisms 40 respectively. As illustrated in FIG. 1, when the user wears the wearable electronic device 10, the display portion 30 is located in front of eyes. As such, the user can see images projected by the display portion 30 to the eyes and simultaneously hear audio from the headphone 20.

Figure 2:
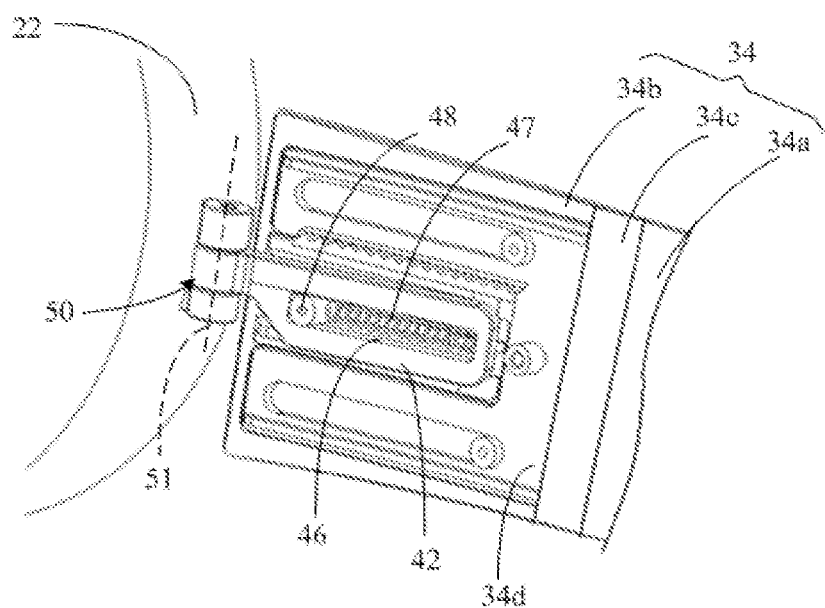
FIG. 2 is an enlarged schematic view showing a part of the wearable electronic device of FIG. 1.
Figure 3:
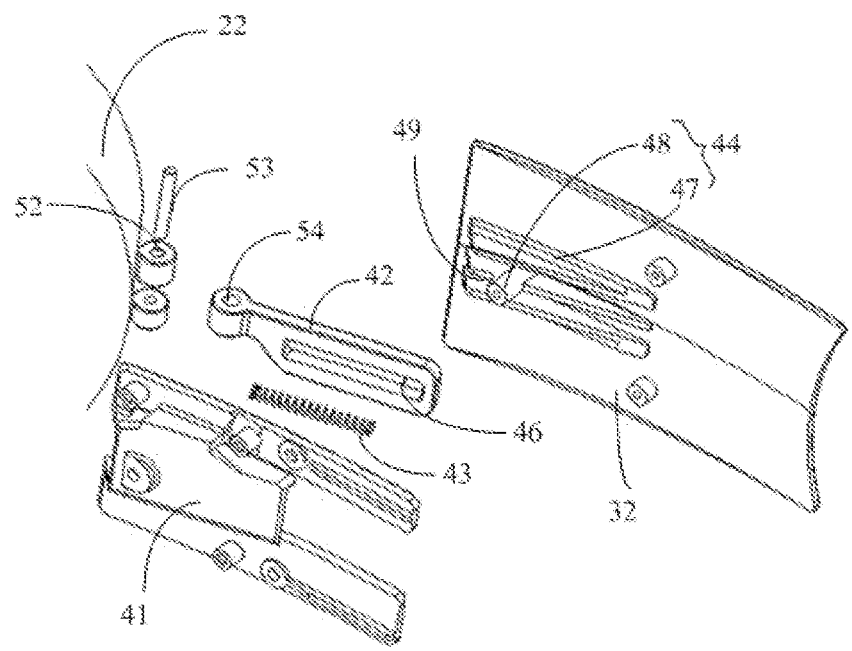
FIG. 3 is an exploded schematic view of a stretching mechanism as illustrated in FIG. 2.

Referring to FIG. 2 and FIG. 3, each of the extension mechanisms 40 includes a first slider 42 connected to a corresponding sound generator 22 and a second slider 44 located at a corresponding end 32. The second slider 44 is slidably connected to the first slider 42. Specifically, in the present implementation, the first slider 42 is a connecting rod. One side of the connecting rod is connected to the sound generator 22, while the other side is provided with an elongate hole 46 extending in a direction in which the sound generator 22 extends towards the end 32. The second slider 44 is provided on an inner surface of the end 32 and includes a boss 48 received in the elongate hole 46. The boss 48 is moveable within the elongate hole 46 in its longitudinal direction.

Without an external force, the boss 48 is located on a side of the elongate hole 46 close to the sound generator 22. As illustrated in FIG. 2, in this case, a distance between the sound generator 22 and the end 32 is shortest. When the user is to wear or remove the wearable electronic device 10, a force should be applied to the two sound generators 22 to move them away from each other, and a distance between the two sound generators 22 is increased. In this case, the first slider 42 moves away from the end 32 along with the sound generator 22, such that the boss 48 slides within the elongate hole 46 in its longitudinal direction and is located close to a side of the elongate hole 46 away from the sound generator 22. As such, the outward deformation of the end 32 of the display portion 30 is greatly reduced due to the first slider 42 sliding relative to the second slider 44, and a restoring force caused by the deformation is also greatly reduced, thereby facilitating operations of the user.

It should be understood that, for the purpose of the extension mechanism 40 enabling the distance between the end 32 of the display portion and the sound generator 22 to vary, the extension mechanism 40 may also be other forms and is not limited to the aforementioned implementations. For example, the extension mechanism may be a stretchable elastic member, such as rubber, which is connected between the end 32 and the sound generators 22.

Referring to FIG. 2 and FIG. 3, preferably, the second slider 44 further comprises a wedge-shaped projection 47 located on the inner surface of the end 32. The wedge-shaped projection 47 has an inclined surface 49 facing away from the inner surface of the end 32, and one side of the wedge-shaped projection 47 away from the sound generator 22 is closer to the inner surface of the end 32 than an opposite side of the wedge-shaped projection 47. The boss 48 extends from the inclined surface 49. The first slider 42 is disposed on the inclined surface 49. As such, when the sound generator 22 is moved outward, the boss 48 slides more easily within the elongate hole 46 due to an inclination angle caused by the wedge-shaped projection 47, thereby further facilitating the operations of the user.

Preferably, each of the extension mechanisms 40 further includes a cover 41 which is fixed to the end 32 and covers the first slider 42. The cover 41 has a convex portion corresponding to the wedge-shaped projection 47 to receive the wedge-shaped projection 47 and the first slider 42, thereby preventing the first slider 42 from being separated from the wedge-shaped projection 47.

Preferably, the wearable electronic device 10 further includes a rotation mechanism 50 disposed on the sound generator 22. The rotation mechanism 50 has an axis 51 parallel to a direction in which one side of the sound generator 22 away from the elastic band 24 extends towards the other side of the sound generator 22 close to the elastic band 24, i.e., substantially in a vertical direction in FIG. 2. The first slider 42 is connected to the rotation mechanism 50 and is rotatable about the axis 51. Specifically, the rotation mechanism 50 includes two first shaft holes 52 which is spaced apart and defines the axis 51, while the first slider 42 includes a second shaft hole 54. A pin 53 extends through the first shaft holes and the second shaft hole. Since the rotation mechanism 50 counteracts the outward rotation of the end 32 caused by the sound generator 22 when the sound generator 22 is moved outward, the deformation of the end 32 in this aspect is reduced to further facilitate the operations of the user.

Preferably, each of the extension mechanisms 40 further comprises a spring 43 disposed between the first slider and the second slider. The spring 43 is operable to produce a restoring force to restore the distance between the first slider and the second slider to an initial one when the distance between the first and second sliders varies. Specifically, the ends of the spring 43 abut against the boss 48 and the side of the elongate hole 46 away from the sound generator 22 respectively. Preferably, the spring 43 is in a compressed state throughout. As such, when the distance between the sound generator 22 and the end 32 becomes larger, the spring 43 is further compressed, such that the boss 48 has a tendency to return to the side of the elongate hole 46 close to the sound generator 22, which also facilitates the operations of the user.

Preferably, as illustrated in FIG. 2, the middle portion 34 further includes a main body portion 34a for displaying images, connecting portions 34b located at two opposite ends of the main body portion 34a respectively, and elastic members 34c. Each of the connecting portions 34b includes a connecting end 34d opposite to the end 32, and the connecting end 34d is connected to the main body portion 34a via the elastic member 34c. The elastic member 34c may be made of material, such as rubber, and so on. When the sound generator 22 is moved outward, the sound generator 22 also causes the upper portion of the connecting portion 34b in FIG. 2 to deflect towards its inner surface, and accordingly the elastic member 34c is deformed so as to avoid the deformation of the main body portion 34a. As such, the deformation in this aspect is reduced, which further facilitates the operations of the user. The elastic member 34c may be made of material, such as silicone rubber, and so on.

Figure 4:
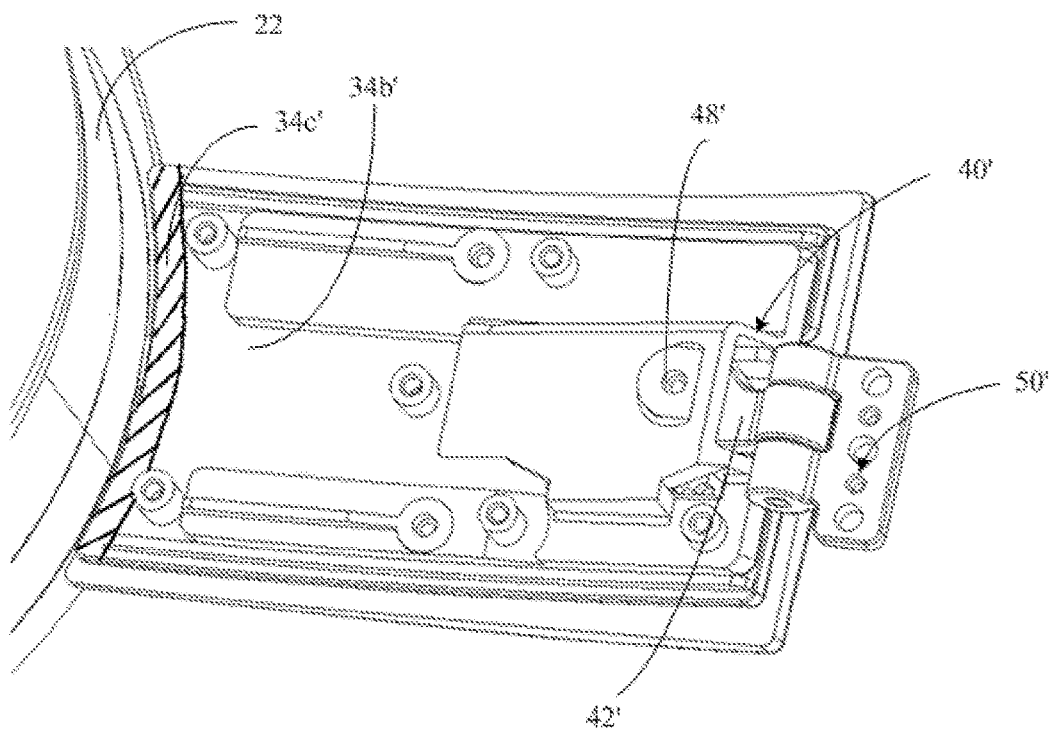
FIG. 4 is a schematic view of a wearable electronic device according to a second implementation of the present disclosure.

FIG. 4 is a schematic view of a wearable electronic device according to a second implementation of the present disclosure. The second implementation is mainly different from the aforementioned implementation in that the extension mechanism 40' is configured in an opposite manner. Specifically, the headphone 20 further includes connecting portions 34b' connected to the sound generators 22 respectively, while the extension mechanism 40' includes a first slider disposed on each of the connecting portions 34b' and a second slider 42' rotatably connected to the end of the display portion via the rotation mechanism 50'. The first slider includes a boss 48' and a wedge-shaped projection. The first slider in this implementation may be understood with reference to the second slider 44 in the aforementioned implementation; the second slider 42' includes a connecting rod having an elongate hole, and may be understood with reference to the first slider 42 in the aforementioned implementation; thus, details are not described in the present implementation. Preferably, the connecting portion 34b' is connected to the sound generator 22 via an elastic member 34c'. In the second implementation, the reference numerals of the components functioning identically to those components in the first implementation are formed by adding "'" after the reference numerals of those components in the first implementation. Persons skilled in the art can be aware of differences between the present implementation and the first implementation from the description of the first implementation in conjunction with FIG. 4, and these differences are not explained herein.

The foregoing is merely the preferable implementations of the present disclosure, and is not intended to limit the present disclosure. Any amendments, equivalent substitutions, improvements, and so forth within the spirit and principle of the present disclosure should be included within the protection scope of the present disclosure.

What is claimed is:

1. A wearable electronic device comprising:
   a headphone comprising two sound generators and an elastic band connecting the two sound generators;
   a display portion comprising two ends and a middle portion located between the two ends; and
   two extension mechanisms each of which connects one sound generator with a corresponding end of the display portion, a distance between the corresponding end of the display portion and the one sound generator being variable;
   wherein each of the extension mechanisms comprises a first slider connected to the one sound generator and a second slider located at the corresponding end of the display portion, and the second slider is slidably connected to the first slider; and
   wherein the second slider further comprises a wedge-shaped projection located on an inner surface of the corresponding end of the display portion, the first slider is disposed on an inclined surface of the wedge-shaped projection, and one side of the wedge-shaped projection away from the sound generator is closer to the inner surface of the corresponding end of the display portion than an opposite side of the wedge-shaped projection.

2. The wearable electronic device of claim 1, wherein the first slider comprises a connecting rod having an elongate hole, the elongate hole extends in a direction in which the one sound generator extends towards the corresponding end of the display portion, and the second slider comprises a boss received in the elongate hole and being movable within the elongate hole in a longitudinal direction of the elongate hole.

3. The wearable electronic device of claim 1, wherein the wearable electronic device further comprises a rotation mechanism disposed on the sound generator and having an axis, and the first slider is connected to the rotation mechanism and is rotatable about the axis.

4. The wearable electronic device of claim 3, wherein the rotation mechanism comprises at least one first shaft hole defining the axis, the first slider comprises at least one second shaft hole, and a pin extends through the first shaft hole and the at least one second shaft hole.

5. The wearable electronic device of claim 1, wherein each of the extension mechanisms further comprises a spring disposed between the first slider and the second slider, and the spring is operable to produce a restoring force to restore a distance between the first slider and the second slider to an initial one when the distance between the first and second sliders varies.

6. The wearable electronic device of claim 1, wherein the middle portion further comprises a main body portion for displaying images, connecting portions located at two opposite ends of the main body portion respectively, and elastic members, each of the connecting portions comprises a connecting end opposite to the corresponding end of the display portion and connected to the main body portion via a corresponding elastic member, and an angle between the main body portion and each of the connecting portions is variable due to deformation of the corresponding elastic member.

7. The wearable electronic device of claim 1, wherein each of the extension mechanisms comprises an elastic member which is elastic at least in a direction in which the one sound generator extends towards the middle portion.

8. A wearable electronic device comprising:
   a headphone comprising two sound generators and an elastic band connecting the two sound generators;
   a display portion comprising two ends and a middle portion located between the two ends; and
   two extension mechanisms each of which connects one sound generator with a corresponding end of the display portion, a distance between the corresponding end of the display portion and the one sound generator being variable;
   wherein the headphone further comprises connecting portions connected to the sound generators, respectively, each of the extension mechanisms comprises a first slider disposed on one connecting portion and a second slider connected to the corresponding end of the display portion, and the second slider is slidably connected to the first slider;
   wherein the first slider further comprises a wedge-shaped projection disposed on an inner surface of the one connecting portion, the second slider is disposed on an inclined surface of the wedge-shaped projection, and one side of the wedge-shaped projection away from the sound generator is away from the inner surface of the connecting portion than an opposite side of the wedge-shaped projection.

9. The wearable electronic device of claim 8, wherein the second slider comprises a connecting rod having an elongate hole extending in a direction in which the one connecting portion extends towards the corresponding end of the display portion, and the first slider comprises a boss received in the elongate hole and being movable within the elongate hole in a longitudinal direction of the elongate hole.

10. The wearable electronic device of claim 8, the wearable electronic device further comprises a rotation mechanism disposed on the corresponding end of the display portion and having an axis, and the second slider is connected to the rotation mechanism and is rotatable about the axis.

11. The wearable electronic device of claim 10, wherein the rotation mechanism comprises at least one first shaft hole defining the axis, the second slider comprises at least one second shaft hole, and a pin extends through the first shaft hole and the at least one second shaft hole.

12. The wearable electronic device of claim 8, wherein each of the extension mechanisms further comprises a spring disposed between the first slider and the second slider, the spring is operable to produce a restoring force to restore a distance between the first slider and the second slider to an initial one when the distance between the first and second sliders varies.

13. The wearable electronic device of claim 8, wherein the headphone further comprises two elastic members each connecting the one sound generator and the one connecting portion, and an angle between each of the connecting portions and each of the sound generators is variable due to deformation of a corresponding elastic member.

* * * * *